United States Patent
Tinnerman

[15] 3,683,438
[45] Aug. 15, 1972

[54] METHOD OF FORMING A PREFORMED GROOVE CUTTING FASTENER STRUCTURE

[72] Inventor: George A. Tinnerman, 3600 Stewart Ave., Miami, Fla. 33133

[22] Filed: Oct. 22, 1970

[21] Appl. No.: 83,021

Related U.S. Application Data

[63] Continuation-in-part of Ser. No. 723,163, April 22, 1968, Pat. No. 3,545,331.

[52] U.S. Cl. ................................................10/86 F
[51] Int. Cl. .........................B21d 53/20, B21d 53/24
[58] Field of Search..10/86, 86 A, 86 F; 85/32, 32 V; 151/20, 22, 34

[56] References Cited

UNITED STATES PATENTS

| | | | |
|---|---|---|---|
| 2,177,004 | 10/1939 | Purtell | 151/22 |
| 2,497,081 | 2/1950 | Hattan | 10/86 A |
| 2,832,972 | 5/1958 | Richards | 10/86 F |
| 2,896,495 | 7/1959 | Crawford | 85/32 |
| 3,160,189 | 12/1964 | Hughes | 85/32 |
| 3,206,967 | 9/1965 | Holton | 10/86 |
| 3,345,899 | 10/1967 | Fiddler | 85/32 |
| 3,368,444 | 2/1968 | Holton | 10/86 |

Primary Examiner—Charles W. Lanham
Assistant Examiner—E. M. Combs
Attorney—Revere B. Gurley

[57] ABSTRACT

A fastener structure is formed by swaging groove cutting or self-tapping ribs or threads in the wall of an aperture, so the ribs will cut a groove or grooves in a stud rotated in the aperture. The walls surrounding the aperture are first deformed to provide helicoidal surfaces bordering the end of the aperture, and the wall is then swaged from the inclined edge to form a rib or thread from each surface of uniform height, or tapering in height according to the angle of the helicoidal surfaces.

The ribs may be formed at each end of the aperture, and the ribs or threads may also be formed to lie on the same helical path, so that the fastener may cut a single groove on a smooth shank or may engage a threaded shank. A deflected portion on each rib provides frictional resistance to rotation of the fastener.

10 Claims, 7 Drawing Figures

PATENTED AUG 15 1972 3,683,438

INVENTOR
GEORGE A. TINNERMAN
BY Revere B Gurley
ATTORNEY

METHOD OF FORMING A PREFORMED GROOVE CUTTING FASTENER STRUCTURE

This application is a continuation-in-part of Tinnerman application, Ser. No. 723,163, filed April 22, 1968, for Preformed Groove Cutting Fastener Structure, now U.S. Pat. 3,545,331.

NATURE AND OBJECTS OF INVENTION

This invention relates to a type of fastener sometimes known as a thread cutting nut, in which a female member has threads or ribs on the wall of its aperture which cut a groove or grooves in a smooth male shank when it is rotated in said aperture. The nut may be formed with punches or dies in a stamping operation, simplifying and reducing the expense of manufacture.

It is an object of this invention to form groove-cutting ribs or threads on the wall of the aperture of a female fastener structure of any desired thickness and radial height, independently of the angle or pitch of the thread. Before this invention, when threads were swaged from the wall of an aperture, these threads increased in height or thickness with the distance from the end of the aperture, so the thread was tapered or non-uniform from one end to the other. This invention now allows the threads or ribs to be formed of uniform thickness or height, if desired, or of any desired taper. These ribs or threads are formed with their ends acting as cutting teeth to cut a groove in a shank rotated in the aperture, the walls of the aperture being formed to allow escape of the cuttings.

A fastener structure according to this invention, which is an improvement of the fastener structure shown in application Ser. No. 640,213, filed May 22, 1967, now U.S. Pat. No. 3,491,646 is first performed to provide inclined, helicoidal surfaces bordering the aperture, so that the edges of the aperture are inclined in the same sense as the threads will be formed. Next, punches swage or shave the wall axially inwardly of each helical edge to form a helical rib spaced from the edge. If the helical angle of the punch is the same as that of the edge of the aperture, the metal will be displaced uniformly along the edge and the rib or thread formed will be uniform in radial height from end to end. A rib or thread varying in height may be formed by employing a punch having a different helical angle than the edge of the aperture, so that a tapering thread is formed.

The ribs or threads may also be formed with deflected portions or lateral protrusions which engage the sides of the grooves and resist rotation of the fastener. These lateral raised portions are formed by notches provided in the punch forming the ribs, so that the metal of the side wall is not shaved or displaced axially to as great an extent as the rib as a whole.

A nut may have preformed helicoidal surfaces on both transverse faces and sets of ribs or threads formed from each face, with the ribs or threads at one end of the aperture lying in the same helical path as those at the other end, so that the ribs follow in the same grooves.

DRAWINGS

DESCRIPTION

Figure 1:
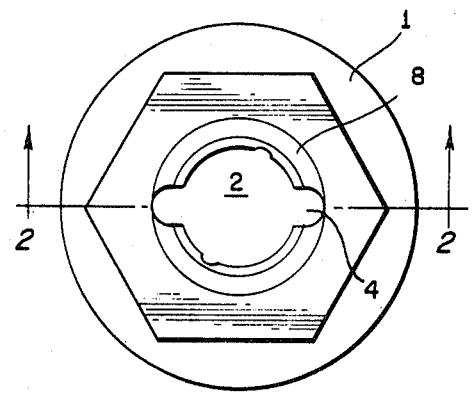
FIG. 1 is a top plan view of a fastener according to this invention.
Figure 2:
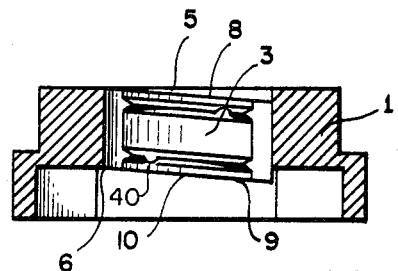
FIG. 2 is an axial cross section on line 2—2 of FIG. 1.
Figure 4:
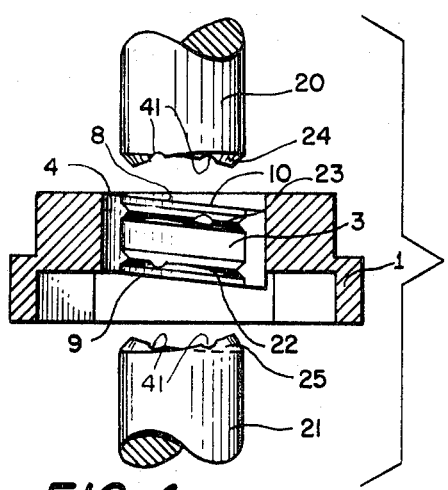
FIG. 4 illustrates the final stage in manufacture of the fastener.

The fastener structure of this invention is embodied in the nut element 1, as shown in FIGS. 1 and 2. This nut element has an aperture 2 therein which has generally cylindrical wall portions 3 separated by discontinuities or slots 5. Each transverse face 5 or 6 has a helicoidal surface 8 or 9 bordering the wall to provide a helical edge 10 inclined axially and circumferentially at the end of the wall.

Figure 3:
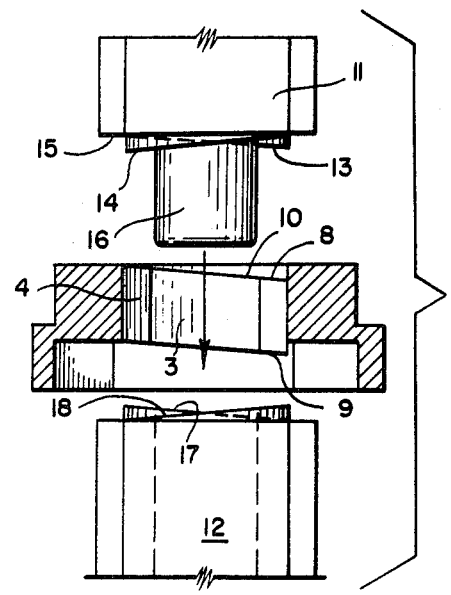
FIG. 3 illustrates a preliminary or preform stage in manufacture of the fastener.

These helicoidal surfaces 8, 9 are formed initially in a preliminary or preform stage, as shown in FIG. 3. After the aperture has been punched in the nut element 1, it is placed between the two dies 11, 12, which approach each other to stamp the preform of the nut. The upper die 11 has opposite helicoidal surfaces 13, 14, the surface 13 forming the helicoidal surface 8 on the preform shown in FIG. 3. This die 11 also has a flat circular shoulder 15 which limits its movement toward the nut. The pin 16 enters the aperture of the nut to center the die on the nut.

The lower die 12 has helicoidal surfaces 17, 18 which are similar to the surfaces 13, 14 on the upper die, the surface 17 forming the surface 9 on the nut shown in FIG. 3. This die also is apertured centrally to receive the pin 16 of the upper die.

This preform shown in FIG. 3 is next placed between punches 20, 21 to form helical ribs or threads 22, 23 on the cylindrical wall portions 3 between the discontinuities 4. The diameter of these punches is larger than the diameter of the aperture 2, so that these punches swage or shave the wall portions 3 at each end of the aperture 2 to form the ribs or threads 22, 23 between the discontinuities 4 by displacing the metal of the wall portions.

The surfaces 24, 25 on the ends of the punches are helicoidal and are at the same angle relative to the axis of the aperture, so that the ribs or threads on opposite ends lie on the same or parallel curves. If the preform helicoidal surfaces 8, 9 are at the same angle, each of the surfaces 24, 25 of the punches will engage the walls of the nut element along the entire edge simultaneously, and the rib or thread will be of uniform thickness or height throughout its length.

In some instances, it has been found that it is advantageous to form a tapering rib. For example, the primary thread or rib 22 which engages the shank initially may increase in radial height from its leading end. This formation will result from providing a helicoidal surface on the preform at a different angle than that of the punch. The face of the punch will then engage the edge of the wall of the nut and start to swage the thread at one end and will progressively engage the wall as it moves axially. The material will be displaced according to the distance the punch travels, and the resulting rib 22 will increase in thickness from end to end.

The ribs 22 and 23 at the opposite ends of the walls are spaced a multiple of one-half the pitch distance, so that each rib 23 will follow in a groove cut by one of the ribs 22. These ribs 23 may, if desired, be formed of different height from the ribs 22 to cut a deeper groove, or either of the ribs also may be formed to taper or increase in height from the leading end, as described above.

In this form of the invention, the helicoidal surfaces 8 or 9 at each end are shown as displaced equal distances from the flat end surface, and the ribs or threads are also equal distances from the end. When rotated on a smooth stud, the ribs at one end will cut two grooves spaced apart one-half the pitch distance of the threads. The leading end of each rib 8 or 9 at its intersection with the discontinuity 4 acts as a tooth to cut the groove, and the rib of the same height follows in the groove. The discontinuity or slot provides space for the cuttings, avoiding jamming the nut by these cuttings. The nut shown is provided with the usual hexagonal wrench seat and is recessed to accommodate a plastic sealing washer or other sealing means.

Figure 6:
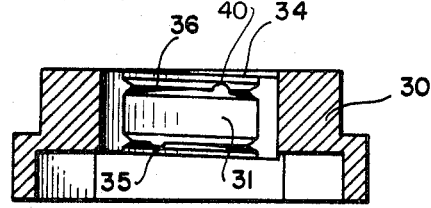
FIG. 6 is an axial cross section taken in direction of the arrows 6—6 of FIG. 5.
Figure 7:
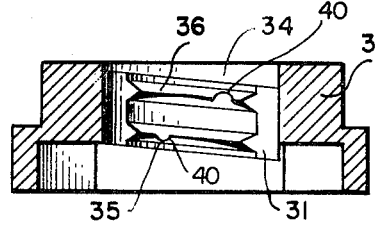
FIG. 7 is an axial cross section taken in the opposite direction of FIG. 6 as indicated by arrows 7—7 of FIG. 5.
Figure 5:
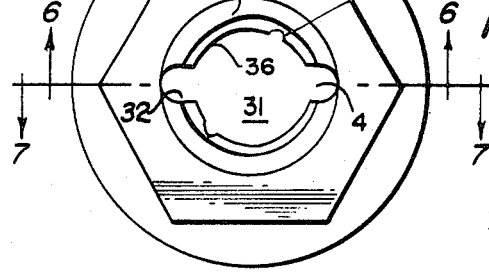
FIG. 5 is a top plan view of a modification of the fastener according to this invention.

In the form of the invention shown in FIGS. 5 to 7, the fastener is formed with ribs or threads which lie in a single helical path and cut a single groove, corresponding to the thread on a tapped nut or die. The nut 30 has an aperture 31 formed with one or more discontinuities 32 and the border of this aperture is stamped to form a single helicoidal surface 33 or 34 at each end. Thus the surface 34 at one side as shown in FIG. 6 is depressed slightly, while the surface 34 on the opposite side is depressed an additional one-half the pitch distance.

The ribs 35, 36 at the opposite ends are formed by punches of corresponding form as in the first modification, and are spaced a multiple of the whole pitch distance. In this way, the ribs at one end cut a single groove and the ribs at the opposite end follow in the same groove. The initial or primary ribs 35 may be formed at an angle to the helicoidal surface 33, so as to taper in thickness or radial height, or the ribs 35 and 36 at opposite ends may be of different radial heights, the secondary ribs 36 cutting the groove deeper after it is cut initially by the primary ribs 35.

The ribs or threads 35, 36 lying in a single, helical path provide in effect a single, interrupted thread and lessen the torque required since only a single groove is cut. These ribs may be designed to correspond to a standard thread and the fastener may then be applied to a threaded stud as well as used as a thread cutting nut. Such a nut is thus universally applicable either to cut a thread in a smooth stud or to engage a standard threaded stud.

The leading ends of the ribs or threads 22, 23 or 35, 36 in both embodiments act as cutting teeth to cut a groove in a smooth shank rotated therein. The ribs may be uniform in heights, if desired, and avoid excessive pressure on the trailing end of the rib. If a slight taper is desired, the ribs may be tapered to increase pressure and to deepen the groove. Other variations in height of the ribs may be developed to conform to other characteristics of torque and clamping force which are needed to meet special conditions. It will also be apparent that the order of the steps of deforming the end faces and swaging the ribs may, in some instances, be reversed, so the ribs are formed circular and the wall is then deformed to produce the helical configuration.

The two or more ribs formed from the same end may differ in height and lie in the same helical path so that the initial cutting rib cuts a shallow groove in the stud and the following rib deepens the groove. For example, the rib 36 shown at the upper side of FIG. 5 and in FIG. 6 will first engage and cut a shallow groove, while the lower rib in FIG. 5 and in FIG. 7 will be formed of greater radial height by being pressed farther axially from the end and will follow in the same groove as that cut initially. In this manner, the groove in the stud will be cut twice the depth. The punch must be formed with guiding surfaces, and the shearing edges must be axially displaced to produce these axially displaced ribs of different radial heights.

The ribs on the walls of the nut may be formed with raised portions or lateral protrusions 40 as shown at 40 to provide frictional resistance to rotation of the nut and thereby avoid loosening on the shank. The protrusions on the sides of the ribs are formed by grinding notches or depressions 41 in the edge of the punch 20 so that the side wall 3 of the nut will not be shaved or milled to as great an extent as the rib as a whole. Since the notches in the punch 20 do not shave the wall to the full extent of the rib, the protrusion will be of slightly less radial height than the rib but will extend axially to engage and groove the shank slightly along the groove cut by the rib as a whole. These protrusions may be formed on only some of the ribs or on all the ribs, as desired.

The embodiments of the invention described and illustrated are examples of the invention which is defined to cover all modifications that are within the scope of the appended claims.

I claim:

1. The method of forming a female fastener structure having an aperture to receive a shank rotated therein, comprising the steps of displacing material concentric with said aperture axially to provide a helicoidal surface bordering said aperture so that the intersection of the wall of said aperture and said helicoidal surface forms a helical edge coaxial with said aperture, and further displacing material of the wall of said aperture adjacent said edge axially by shaving said material from said edge axially to form a helical rib spaced axially inward of said edge.

2. The method of forming a female fastener structure having an aperture to receive a shank rotated therein, comprising the steps of displacing material around said aperture axially in one direction to provide complementary helicoidal surfaces bordering said aperture at opposite ends, so that the intersection of the wall of said aperture and each of said helicoidal surfaces forms a helical edge, and further displacing the material of the wall of said aperture axially inwardly in opposite directions from said helical edges to form a helical rib inwardly of each of said edges, the ribs at one end of said aperture being spaced a multiple of one-half the pitch distance from the ribs at the opposite end.

3. The method of forming a female fastener structure having an aperture and a helical rib on the wall of said aperture comprising forming the material adjacent an end of the aperture at an acute angle to a plane normal to the axis aperture with the edge of said aperture concentric with the aperture, and displacing the material of the wall of said aperture axially by shaving the wall of said aperture from the said acute angle end axially inwardly to force said material radially inwardly and form a rib spaced from said end and at an acute angle to a plane normal to the axis of said aperture.

4. The method of forming a female fastener as claimed in claim 3, in which the radial height of said rib is proportional to its axial distance from the said end of said aperture formed at an acute angle.

5. The method of forming a female fastener structure as claimed in claim 3, in which the material forming said rib at one point is pressed out of the line of said rib during formation of said rib, to form a protrusion on the side of said rib at said point.

6. The method of forming a female fastener structure as claimed in claim 5, in which said rib at said one point is pressed a less distance axially than the line of said rib on opposite sides of said point, so that a protrusion is formed on the side of said rib toward said end of said aperture at said acute angle.

7. The method of forming a female fastener structure having an opening in one surface of said structure which comprises, first, displacing the material axially adjacent the edge of said opening a varying distance from the surface of said structure to form a surface bordering said opening at an angle to a plane normal to the axis of said opening, so that the edge of the displaced material varies in distance from said surface, and, second, displacing the wall of said opening by shaving the material from said edge axially inwardly to form a rib spaced from said edge and inclined to a plane normal to the axis of said opening.

8. The method of forming a female fastener as claimed in claim 7, in which the wall of said opening has a radially outwardly extending space along said wall at one end of said displaced material at the edge of said opening.

9. The method of forming a female fastener as claimed in claim 8, in which said wall has a plurality of said radially outwardly extending spaces, and said material axially adjacent the edge of said opening is displaced between successive spaces, and a rib is formed between successive spaces.

10. The method of forming a female fastener as claimed in claim 8, in which a rib is formed between each two successive spaces, said ribs being different axial distances from said edge of said opening to lie in a single helical curve, said ribs increasing in radial height with increased distance from said edge.

* * * * *